United States Patent [19]

Davis et al.

[11] Patent Number: 5,818,585
[45] Date of Patent: Oct. 6, 1998

[54] FIBER BRAGG GRATING INTERROGATION SYSTEM WITH ADAPTIVE CALIBRATION

[75] Inventors: Michael A. Davis, Alexandria; Alan D. Kersey, Fairfax Station, both of Va.; David G. Bellemore, Menlo Park, Calif.

[73] Assignee: The United States of America as represented by the Secretary of the Navy, Washington, D.C.

[21] Appl. No.: 810,167

[22] Filed: Feb. 28, 1997

[51] Int. Cl.$^6$ .................................................. G01B 9/02
[52] U.S. Cl. .................................. 356/345; 356/35.5
[58] Field of Search ............................. 356/345, 352, 356/35.5

[56] References Cited

U.S. PATENT DOCUMENTS

| | | |
|---|---|---|
| 5,022,730 | 6/1991 | Cimini et al. . |
| 5,380,995 | 1/1995 | Udd et al. . |
| 5,397,891 | 3/1995 | Udd et al. . |
| 5,401,956 | 3/1995 | Dunphy et al. . |
| 5,680,489 | 10/1997 | Kersey .................................. 356/345 |

OTHER PUBLICATIONS

Alavie, A. T., M. M. Ohn, D. J. Glennie, S. E. Karr, R. Maaskant, G. Fishbein, R. Lee, S. Y. Huang, and R. M. Measures, "Practical Considerations for a Four Channel Multiplexed Bragg Grating Fiber Sensor System", SPIE vol. 2072, 1994.

Kersey, Alan D., "Interrogation and Multiplexing Techniques for Fiber Bragg Grating Strain–Sensors", SPIE vol. 2071, 1993.

Davis, M. A., D. G. Bellemore, A. D. Kersey, M. A. Putnam, E. J. Friebele, R. L. Idriss, and M. Kodinduma, "High Sensor–Count Bragg Grating Instrumentation System for Large–Scale Structural Monitoring Applications", Smart Struct., Feb. 1996.

Kersey, A. D., T. A. Berkoff, and W. W. Morey, "Multiplexed Fiber Bragg Grating Strain–Sensor System with a Fiber Fabry–Perot Wavelength Filter", Optics Letters vol. 18, No. 16, Aug. 1993.

Berkoff, T. A., M. A. Davis, D. G. Bellemore, and A. D. Kersey, "Hybrid Time and Wavelength Division Multiplexed Fiber Bragg Grating Sensor Array", SPIE vol. 2444, 1995.

Kersey, A. D., T. A. Berkoff, and W. W. Morey, "Fiber–Optic Bragg Grating Strain Sensor With Drift–Compensated High–Resolution Interferometric Wavelength–Shift Detection", Optics Letters vol. 18, No. 1, Jan. 1993.

Davis, M. A., A. D. Kersey, J. Sirkis and E. J. Friebele, "Fiber Optic Bragg Grating Array for Shape and Vibration Mode Sensing", Smart Struct., Feb. 1994.

Kersey, A. D., M. A. Davis, T. A. Berkoff, D. G. Bellemore, K. P. Koo, and R. T. Jones, "Progress Towards the Development of Practical Fiber Bragg Grating Instrumentation Systems", SPIE vol. 2829, Aug. 1996.

Kersey, A. D., T. A. Berkoff, and W. W. Morey, "Two–Channel Fiber Bragg–Grating Strain Sensor with High Resolution Interferometric Wavelength Shift Detection", SPIE vol. 1798, 1993.

Davis, M. A., D. G. Bellemore and A. D. Kersey, "Structural Strain Mapping Using a Wavelength/Time Division Addressed Fiber Bragg Grating Array", Smart Struct., Oct. 1994.

(List continued on next page.)

*Primary Examiner*—Frank G. Font
*Assistant Examiner*—Robert Kim
*Attorney, Agent, or Firm*—Thomas E. McDonnell; George Jameson

[57] ABSTRACT

A system and method for providing accurate measurements of the reflected wavelengths from multiple strings of fiber Bragg grating (FBG) elements using a single scanning optical filter and an isolated duplicate reference string of FBG elements. A reference string of FBG elements permits precise long-term wavelength determination of sensors by providing real-time adaptive calibration adjustments to correct for any nonlinearities in the response of the single scanning optical filter.

12 Claims, 12 Drawing Sheets

OTHER PUBLICATIONS

Davis, M. A., D. G. Bellemore, T. A. Berkoff, and A. D. Kersey, "Design and Performance of a Fiber Bragg Grating Distributed Strain Sensor System", SPIE vol. 2446, 1995.

Kersey, A. D., M. A. Davis, and D. Bellemore, "Development of Fiber Sensors for Structural Monitoring", NonDestructuve Eval., Jun. 1995.

Davis, M. A., D. G. Bellemore, M. A. Putnam, and A. D. Kersey, "High Strain Monitoring in Composite–Wrapped Concrete Cylinders Using Embedded Fiber Bragg Grating Arrays", Smart Struct., Feb. 1996.

Davis, M. A., D. G. Bellemore, M. A. Putnam, and A. D. Kersey, "A 60 Element Fiber Bragg Grating Sensor System", OFS, May 1996.

Davis, M. A., D. G. Bellemore, M. A. Putnam, and A. D. Kersey, "Interrogation of 60 Fiber Bragg Grating Sensors with $\mu$Strain Resolution Capability", Electronics vol. 32, Jul. 1996.

FIBER BRAGG GRATING INTERROGATION SYSTEM WITH ADAPTIVE CALIBRATION

SPECIFICATION

1. Field of the Invention

The present invention relates generally to the field of fiber optic sensors and, more particularly, to calibrating wavelength returns from fiber optic sensors.

2. Description of the Related Art

The basic prior art concept for addressing multiple Bragg gratings consists of a broadband source such as a light-emitting diode (LED), edge-emitting LED (ELED), or other superluminescent device illuminating a series of gratings along a fiber (a 'string' of gratings). When illuminated, each Bragg grating reflects a narrowband component of light at the Bragg wavelength, given by the expression:

$$\lambda_B = 2n\Lambda \quad (1)$$

where $\Lambda$ is the grating pitch and n is the effective index of the core. Perturbation of the grating, by temperature or strain, for example, results in a shift in the Bragg wavelength, which can be detected in the reflected spectrum. This shift can then be compared with the unperturbed Bragg wavelength to determine the extent of the perturbation.

One of the benefits of an FBG sensor lies in the fact that information is encoded into wavelength. This has a number of distinct advantages over other direct intensity based sensing schemes. Most importantly, wavelength is an absolute parameter. As a result, wavelength measurements are not affected by total light levels, losses in the connecting fibers and couplers, or source power.

Thus, fiber optic sensors based on the use of fiber Bragg grating (FBG) devices are useful in a variety of applications. They are particularly useful as embedded sensors for smart structures where the sensors can be used for real time evaluation of load, strain, temperature, vibration, and other variables. Since many gratings can be written into a length of fiber and addressed using multiplexing techniques, FBG sensors can provide quasi-distributed sensing capabilities.

A key to capitalizing on the benefits of Bragg sensing in field applications is the fast and reliable detection of grating reflections. One way to achieve this fast and reliable detection is with the use of a scanning filter. Such filters, however, are very sensitive to various parameters, such as temperature, age, and construction techniques. As a result, the spectral response of the filter can change over time. This "drift" in the spectral response effectively decreases the resolution of the optical filter, reducing the accuracy of wavelength detections.

In light of the foregoing, there is a need for a system and method to improve the resolution of a wavelength determination system by compensating for any drift in the spectral response of a scanning filter.

SUMMARY OF THE INVENTION

Accordingly, the present invention is directed to a system and method for compensating for drift in the spectral response of a filter by measuring the reflected wavelengths from multiple fiber Bragg grating elements and a reference set of fiber Bragg grating (FBG) elements. The reference FBG elements permit precise long-term wavelength determination of sensors by providing real-time adaptive calibration adjustments to correct for any nonlinearities in the scanning optical filter response, thus maintaining the resolution of the system.

Additional features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

To achieve these and other advantages and in accordance with the purpose of the invention, as embodied and broadly described a system according to this invention includes a source of reference wavelength signals, a comparator for comparing the reference wavelength signals to previously stored wavelength signals, a receiver for receiving through an optical filter spectral returns from at least one sensor optical fiber having at least one grating, and a processor for processing the spectral returns to determine their wavelengths wherein the processor includes a compensator for compensating for filter characteristics based on the comparison of the reference wavelength signals and the previously stored wavelength signals.

In another aspect, a method according to this invention includes the steps of obtaining reference wavelength signals, comparing the reference wavelength signals to previously stored wavelength signals, receiving through an optical filter spectral returns from at least one sensor optical fiber having at least one grating, and processing the spectral returns to determine their wavelengths wherein the processing includes the step of compensating for filter characteristics based on the comparison of the reference wavelength signals to previously stored wavelength signals.

Both the foregoing general description and the following detailed description are exemplary and explanatory and do not restrict the invention as claimed. The accompanying drawings, which are incorporated in and constitute a part of this specification, illustrate embodiments of the invention and, together with the description, explain the principles of the invention.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DESCRIPTION OF THE PREFERRED EMBODIMENT

Reference will now be made in detail to the present preferred embodiment of the invention, an example of which is illustrated in the accompanying drawings.

Reference will now be made in detail to the present preferred embodiment of the invention, an example of which is illustrated in the accompanying drawings. Where possible, like numerals are used to refer to like or similar components.

Figure 1:
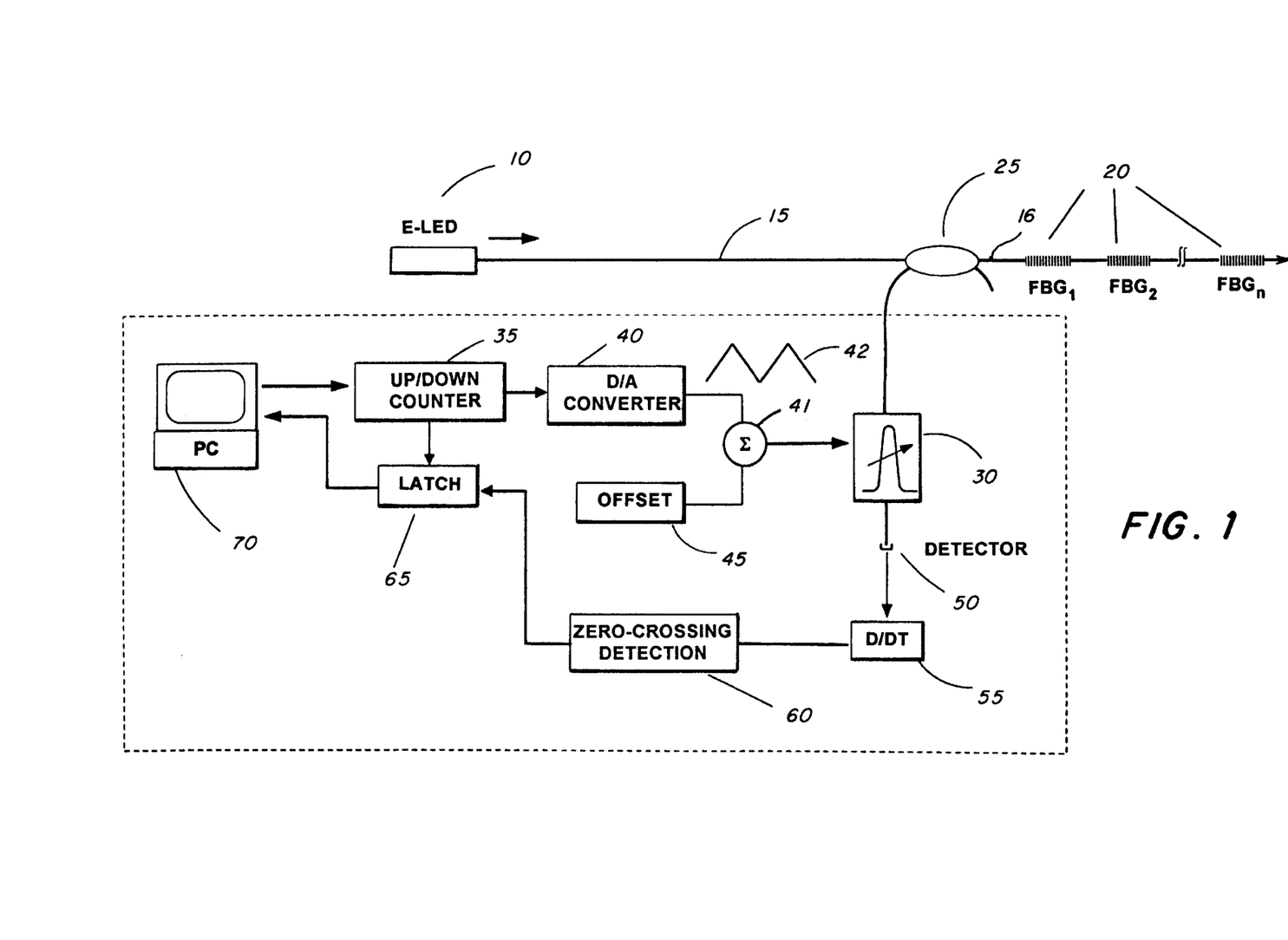
FIG. 1 is a schematic block diagram of an apparatus for addressing an FBG array.

The exemplary embodiment of a wavelength determination system invention is shown in FIG. 1. As embodied herein and referring to FIG. 1, the wavelength determination system includes an edge-emitting light-emitting diode (ELED) 10, which transmits light through single mode optical fiber 15, through optical coupler 25, and into single mode optical fiber 16. A number of fiber Bragg gratings (FBGs) 20 are written into the optical fiber 16, in a manner well known in the art. These FBGs 20 will reflect specific optical wavelengths back through optical coupler 25 and into a tunable optical filter 30. The digital output from a digital, up/down counter 35 is converted to an analog voltage by a digital-to-analog (D/A) converter 40 and summed in a summing circuit 41 with a direct current (dc) offset voltage from an offset circuit 45 (to be discussed) to provide a signal to tune the tunable optical filter 30.

A photodetector 50 converts the optical output of tunable optical filter 30 into an electrical signal. A derivative unit 55 takes the derivative of this electrical signal and feeds it into zero-crossing detection circuitry 60. When zero-crossing detection circuitry 60 detects a zero-crossing, it sends an electrical signal to a latch 65 which captures the current value of the up/down counter 35. A computer (PC) 70 stores and processes the latched value. A more detailed description of the invention will be given in connection with its operation.

In FIG. 1 ELED 10 transmits light into the optical fiber 16 which contains a plurality of fiber Bragg gratings (FBGs) 20. The FBGs 20 reflect certain wavelengths of light according to equation (1).

Figure 2A:
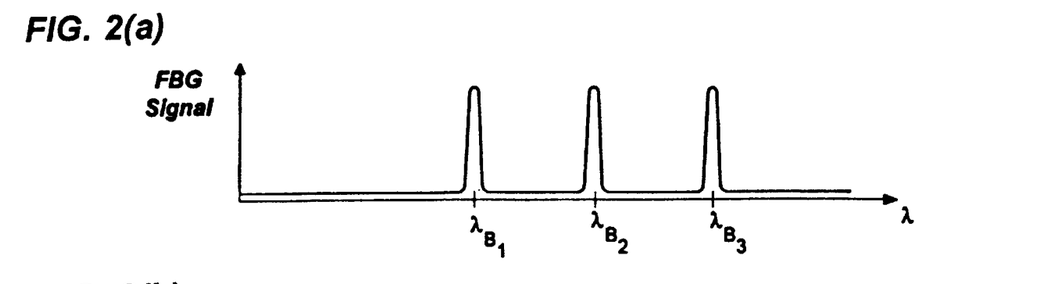
FIG. 2(a) shows the optical return signal from the Bragg gratings of FIG. 1.

FIG. 2(a) depicts a typical set of return wavelengths for three FBGs 20 located along optical fiber 16. Optical coupler 25 directs the FBG return wavelengths into tunable passband optical filter 30, preferably a fiber Fabry-Perot (FP) filter. As is well known in the art, the passband of FP filters may be altered by electrically controlling the piezoelectric material creating the mirror spacing of the filter. The free spectral range of optical filter 30 must correspond to the range of possible reflected wavelengths from the FBGs 20. For example, using an array of 12 FBGs spaced by 3 nanometers (nm), the FP filter 30 should have a free spectral range of around 45 nm.

A ramp waveform 42 controls the passband of optical filter 30. To generate ramp waveform 42, up/down counter 35 continuously counts from its lowest digital value to its highest, and back down. This digital signal is fed into D/A converter 40 which converts the signal to analog form, resulting in ramp waveform 42. Ramp waveform 42 controls the passband of optical filter 30 so that the filter 30 scans through the range of wavelengths reflected by the FBGs 20. An appropriate offset 45 is added to ramp waveform 42 to properly bias the filter 30.

Figure 2B:
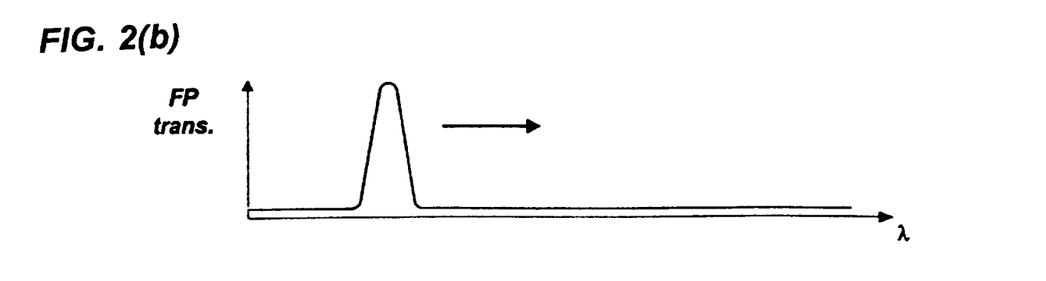
FIG. 2(b) shows the spectrum of the scanning optical filter of FIG. 1.

FIG. 2(b) shows a typical passband of an FP filter, which scans through a wavelength spectrum.

As the passband of optical filter 30 sweeps through the spectral range, the FBG spectral returns are accordingly passed through optical filter 30 to photodetector 50. Photodetector 50 converts the FBG spectral returns into electrical signals, shown in FIG. 2(c). The peaks in this signal correspond to the reflected wavelengths from the FBGs. Therefore, it is necessary to precisely isolate the center of the peaks. The profile width of optical filter 30, however, limits the resolution of the photodetector signal. To improve the resolution, derivative unit 55 takes the derivative of the photodetector signal, resulting in the signal shown in FIG. 2(d). The derivative of the photodetector signal produces a zero-crossing $t_{B1}$, $t_{B2}$, and $t_{B3}$ at each of the central wavelengths of the peaks in the photodetector signal.

Figure 2C:
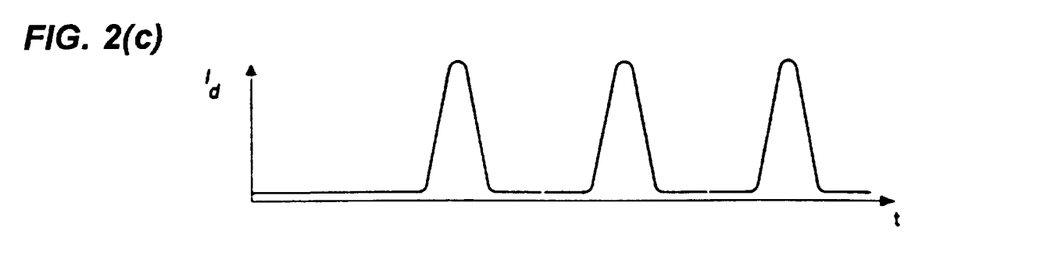
FIG. 2(c) shows the electrical signal present at the output of the photodetector of FIG. 1.
Figure 2D:
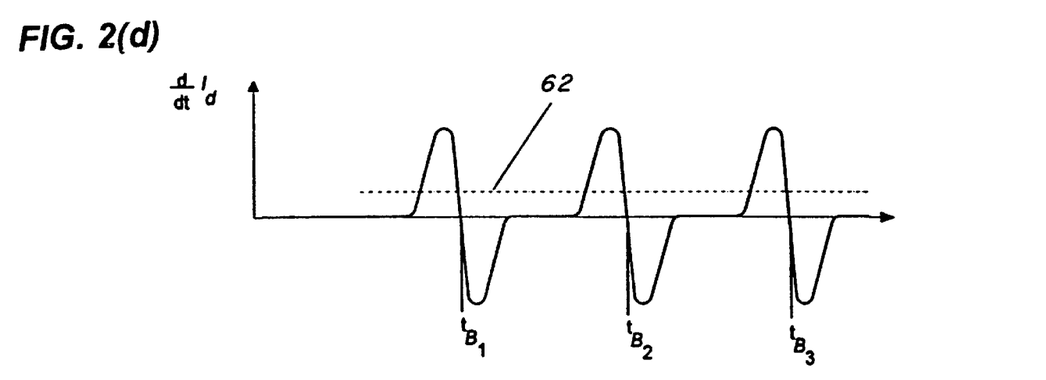
FIG. 2(d) shows the electrical signal present at the output of the derivative unit of FIG. 1.
Figure 3:
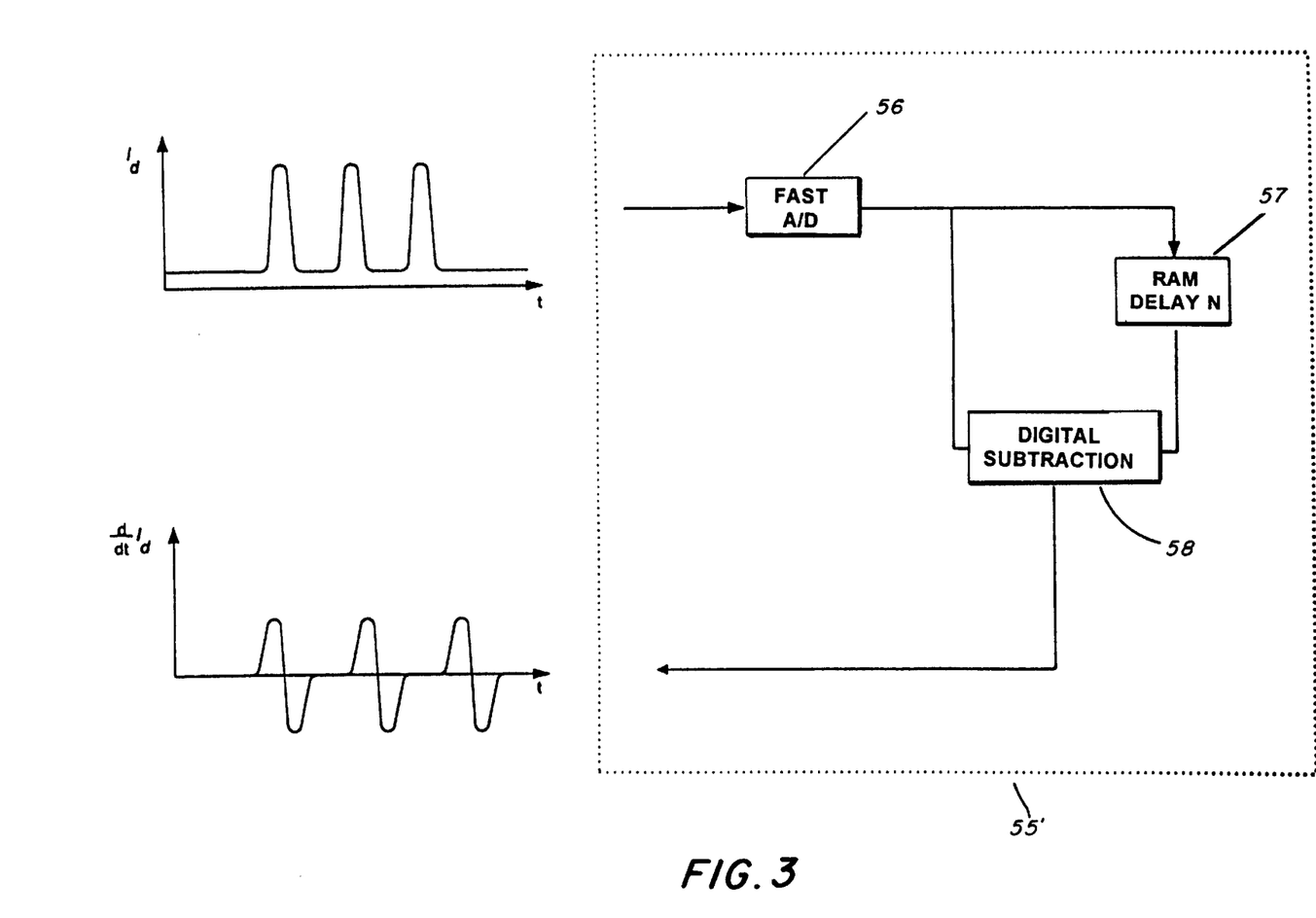
FIG. 3 is a diagram of a derivative circuit.

The derivative of the signal may be performed in an analog circuit, a microprocessor or through the digital circuit shown in FIG. 3. In FIG. 3, the circuit 55' corresponds to derivative unit 55 in FIG. 1. The photodetector signal of FIG. 2(c) is passed to a fast analog to digital (A/D) converter 56 (such as the 16-bit Burr-Brown ADS7811) and then to a digital stack (RAM) 57, which serves to delay the measured value by a predetermined number of clock cycles N. A digital subtraction unit 58 then digitally subtracts the delayed photodetector signal from the direct signal to form an approximation of the signals shown in FIG. 2(d).

Zero-crossing detection circuitry 60 receives the output signal from derivative unit 55. When the voltage of the signal fed to zero-crossing detection circuitry 60 equals zero, the circuitry 60 activates latch 65. Latch 65 captures the current value of up/down counter 35, which corresponds to the wavelength optical filter 30 was tuned to when zero-crossing detection circuitry 60 detected a zero-crossing. This value can then be compared, in the exemplary computer 70, to the previously stored value associated with the unperturbed zero-crossing return wavelength. To ensure that zero-crossing detection circuitry 60 does not trigger latch 65 during spurious zero-crossings between actual FBG returns, the circuitry 60 preferably contains a threshold detector. The threshold detector detects when the input signal rises above a predetermined level, shown by the dotted line 62 of FIG. 2(d), and signals to zero-crossing detection circuitry 60 that the next zero-crossing corresponds to a true FBG return.

To sum to this point, perturbations of the gratings alter the Bragg resonance conditions and change the wavelength of the reflected components. This results in shifts in the counter values at which zero-crossings occur that can then be translated into wavelength shifts representing the degree of perturbation. Using this approach, the central wavelength of several FBG sensors can be determined during each scan ramp cycle of the tunable FP filter. Scanning the filter at rates of several hundred hertz to potentially several kHz allows rapid updating of the FBG wavelengths. The use of an exemplary 16 bit up-down counter 35 for generation of the ramp signal provides a least significant bit resolution of less than 1 picometer (pm) for a filter with a free spectral range of less than 60 nanometers (nm). This wavelength resolution corresponds to a strain resolution of less than 1 µstrain at an operational wavelength of about 1.3 micrometers or microns (µm).

As discussed above, the bandwidth of the broadband source limits the number of sensors this system can address. A typical broadband source can address from, for example, 1 to 16 grating elements. By using the following techniques, however, the scanning wavelength filter can be used to scan spectral returns from several strings of gratings where each string contains a number of grating elements. This increases the overall number of grating elements that a single scanning wavelength filter can address, allowing mapping of large structural surfaces.

Figure 4:
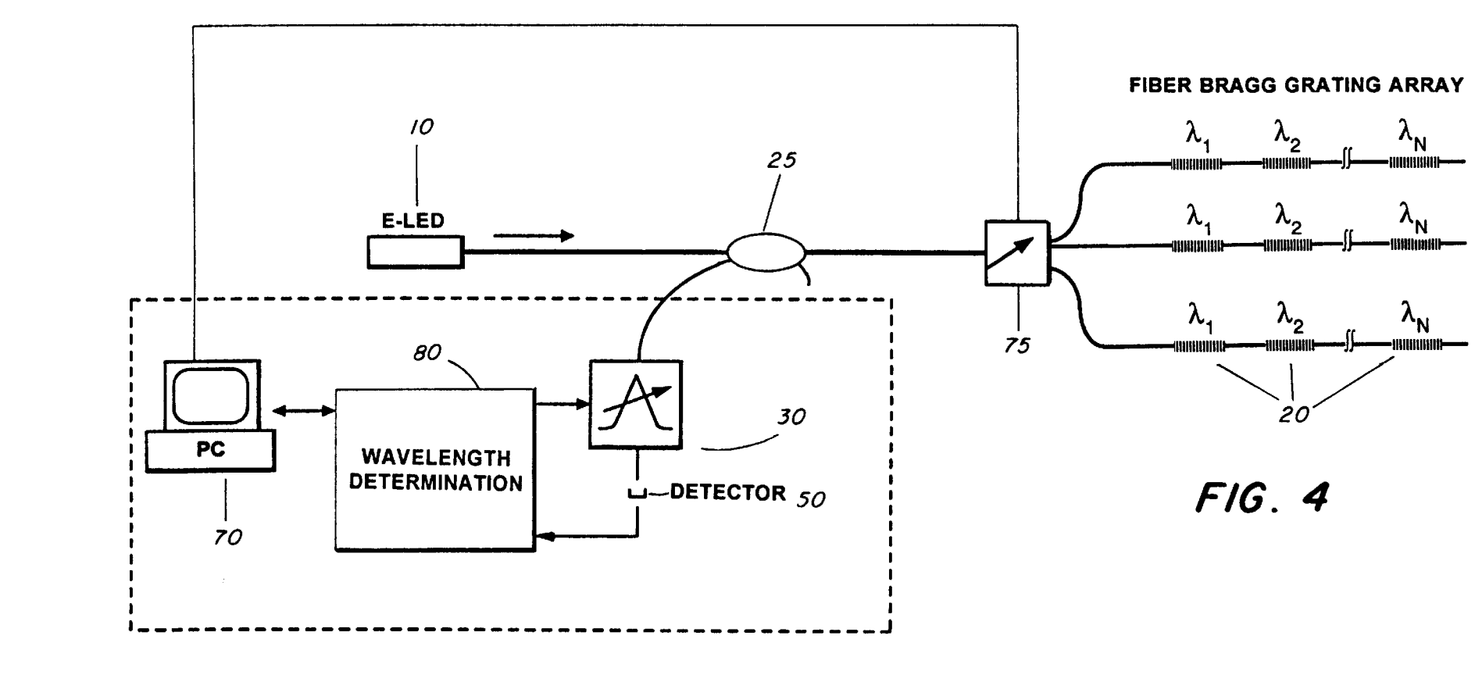
FIG. 4 is a multiple array configuration utilizing a synchronously driven switch.

The first technique, illustrated in FIG. 4, uses an optical switch 75 (available from DiCon) that connects a single broadband source 10 and an optical filter 30 to a plurality of grating strings. Preferably, the computer 70 controls the optical switch 75 to sequentially interrogate each string. Wavelength determination block 80 corresponds to the combination of up/down counter 35, D/A converter 40, offset 45, latch 65, zero-crossing detection 60, and derivative unit 55 of FIG. 1.

The interrogation of each string proceeds in the manner described above. However, when the value of the up/down counter 35 for each string is latched into the computer 70, the computer 70 then associates the stored value with the corresponding position of the optical switch 75. In this way, the computer 70 can compare the spectral returns from each string with the previous returns from the same string. Thus, the addressing capability of the wavelength interrogation system increases manifold. For a sampling rate of approximately 1 kilohertz, the wavelength determination system can address 16 strings at approximately 60 hertz, a frequency adequate for many structural strain monitoring applications.

Figure 5:
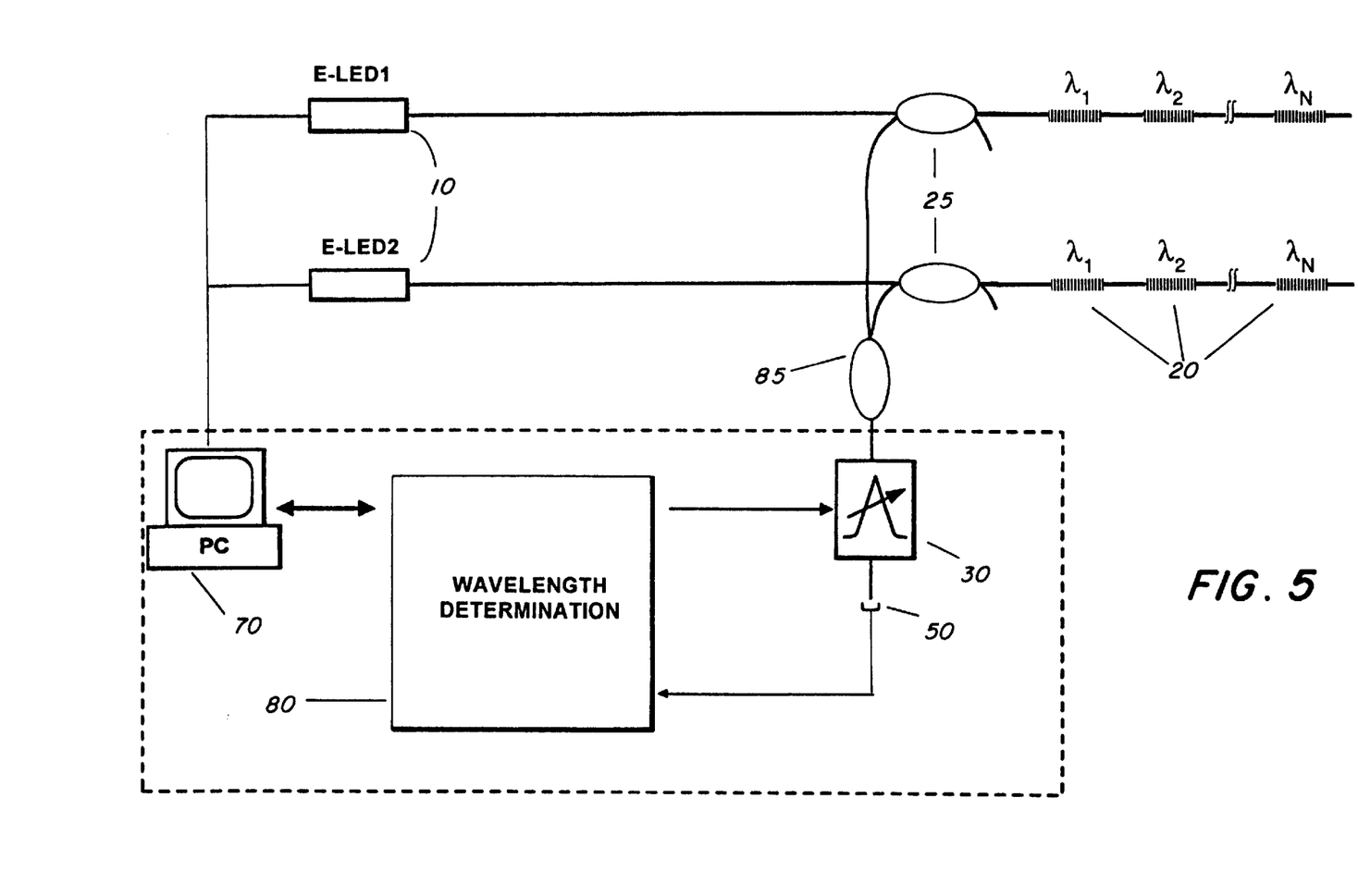
FIG. 5 is a multiple array configuration using synchronously driven sources.

In a second technique, shown in FIG. 5, a plurality of broadband sources 10 each address a string of gratings. The computer 70 sequentially enables each of the broadband sources 10. A star coupler 85 combines returns from the strings allowing processing by a single scanning filter 30. Wavelength determination block 80 refers to the same components described with FIG. 4.

The interrogation of each string proceeds in the manner described above with FIG. 1. However, when the value of up/down counter 35 is latched into the computer 70, the computer 70 then associates the stored value with the corresponding enabled broadband source 10. In this way, the computer 70 can compare the spectral returns from each string with previous returns from the same string.

Figure 6:
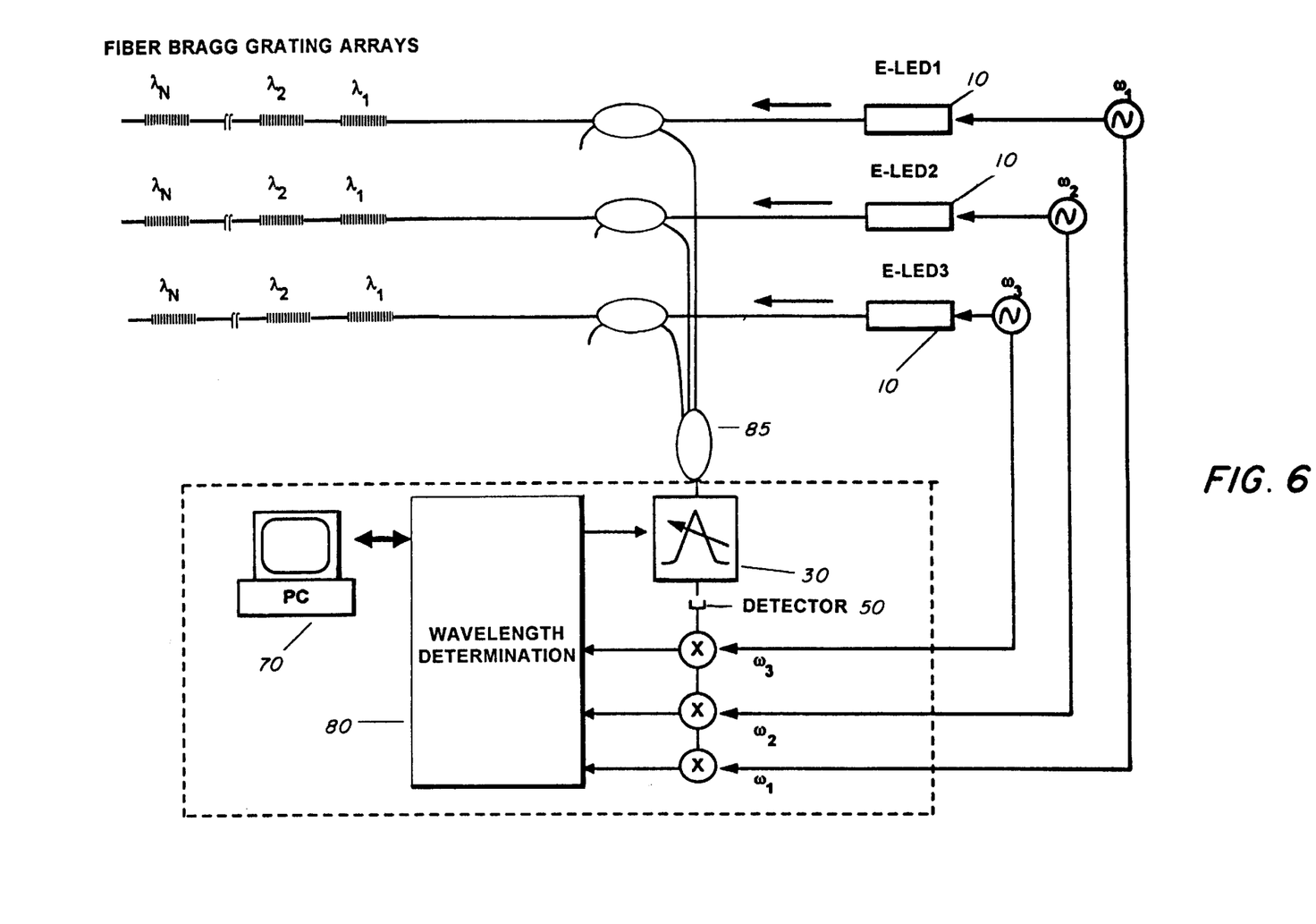
FIG. 6 is a multiple array configuration using frequency intensity modulation.
Figure 7:
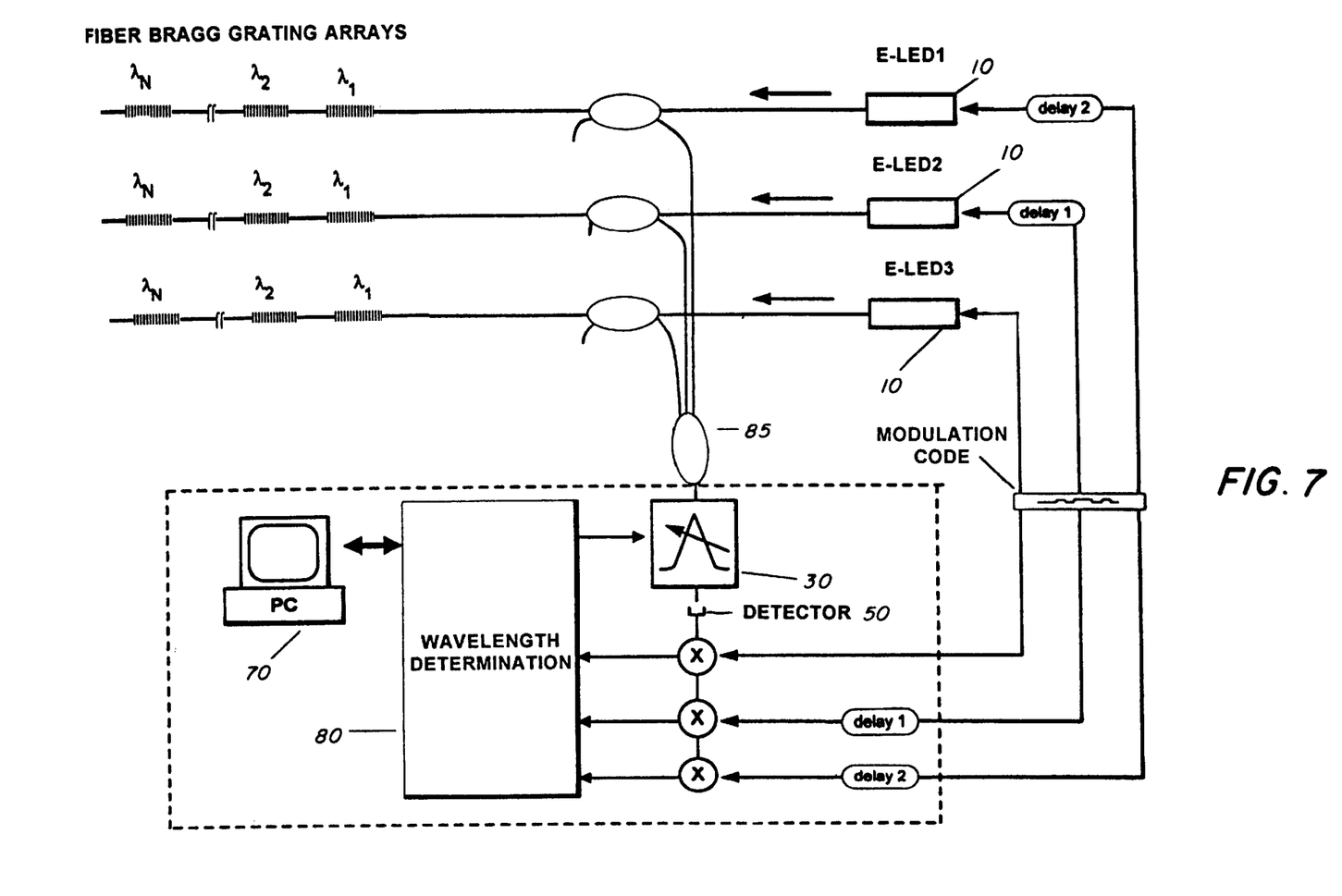
FIG. 7 is a multiple array configuration using code intensity modulation.

In a third technique, shown in FIGS. 6 and 7, a plurality of broadband sources 10 each illuminate a string of Bragg grating sensors. As in the second embodiment, a star coupler 85 combines the spectral returns from the strings allowing processing by a single scanning filter 30. However, unlike the second embodiment, each of the sources 10 runs continuous-wave (CW). In order to differentiate among the spectral returns, the sources are intensity-modulated. This can be done, for example, with frequency or code modulation. In the former case, shown in FIG. 6, the sources are modulated at different frequencies with the frequency components synchronously detected at the photodetector 50 output. In the latter, shown in FIG. 7, a code such as an m-sequence or Gold code is applied to each source. Correlation detection at the photodetector 50 output separates outputs from each grating string.

A difficulty with the system shown in FIG. 1, and similar systems which use an optical filtering approach, is that they rely on the optical filter to remain stable and produce a linear scan for accurate interpretation of the wavelengths returned by the FBG elements. However, some types of optical filters will exhibit nonlinearities in their response and do not provide a true linear wavelength scan. Additionally, the nonlinearities may change with time due to possible deterioration of moving parts in a mechanical scanning configuration or with temperature variations, such as the piezoelectric elements used in some fiber FP filters. As a result, the readings obtained from a system using these elements may become unreliable over time or with temperature variations without a specific fixed reference. With the use of an isolated reference array of FBG elements or a spectral comb with known wavelength spacing which passes through the optical filter as the sensing FBG elements, the system can compensate for nonlinearities and obtain increased wavelength determination accuracy.

Figure 8A:
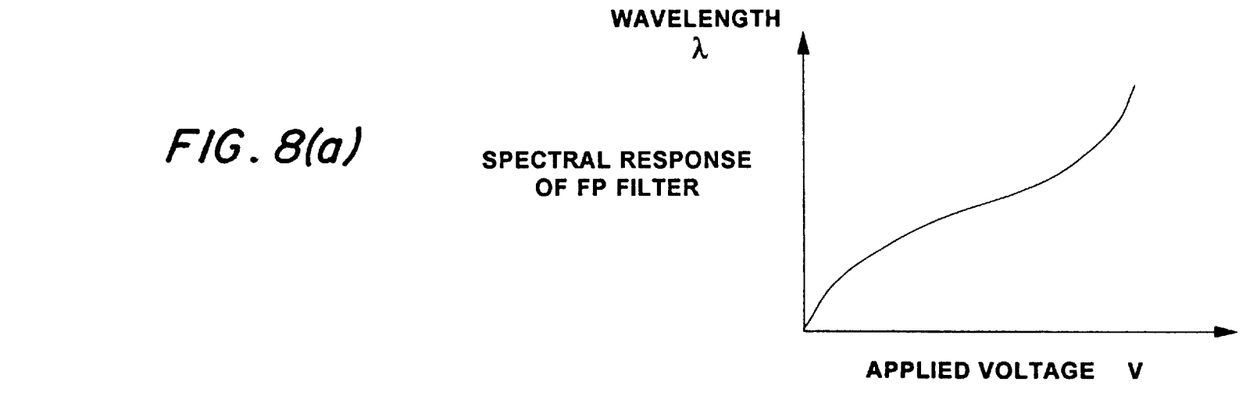
FIG. 8(a) shows the spectral response of a scanning filter.
Figure 8B:
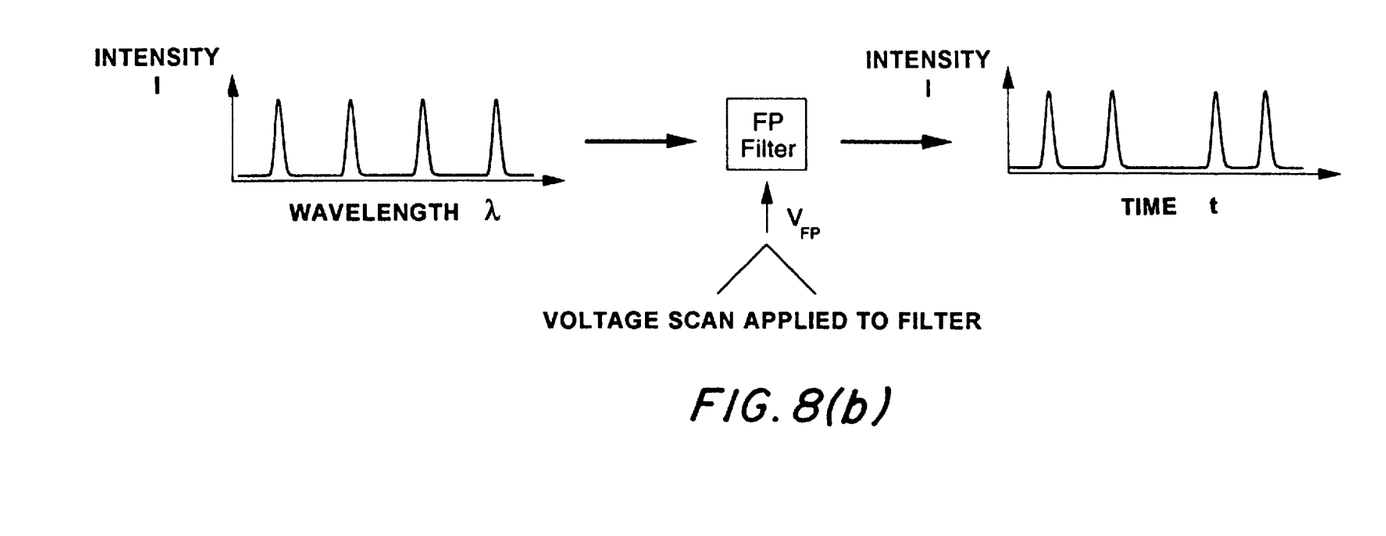
FIG. 8(b) shows the effect of nonlinearities in the scanning filter.

FIG. 8(a) shows a typical nonlinear spectral bandpass response of a Fabry-Perot filter to an applied voltage. FIG. 8(b) shows a set of 4 evenly spaced FBG return signals which are passed through the filter. Even though a constant voltage ramp is applied to the filter, the output signals are affected by the nonlinear response of the filter. Similarly, in the system of FIG. 1, as the return FBG signals are referenced to the applied voltage, a certain error is present on each signal depending on its spectral location. However, if a set of reference signals with a known fixed spectral separation were passed through the optical filter the nonlinearities in the filter response could be mapped and compensated for in the determination of the sensing signals. In the present invention, a separate mechanically isolated and thermally stabilized FBG array constitutes the source of the reference signals.

Figure 9:
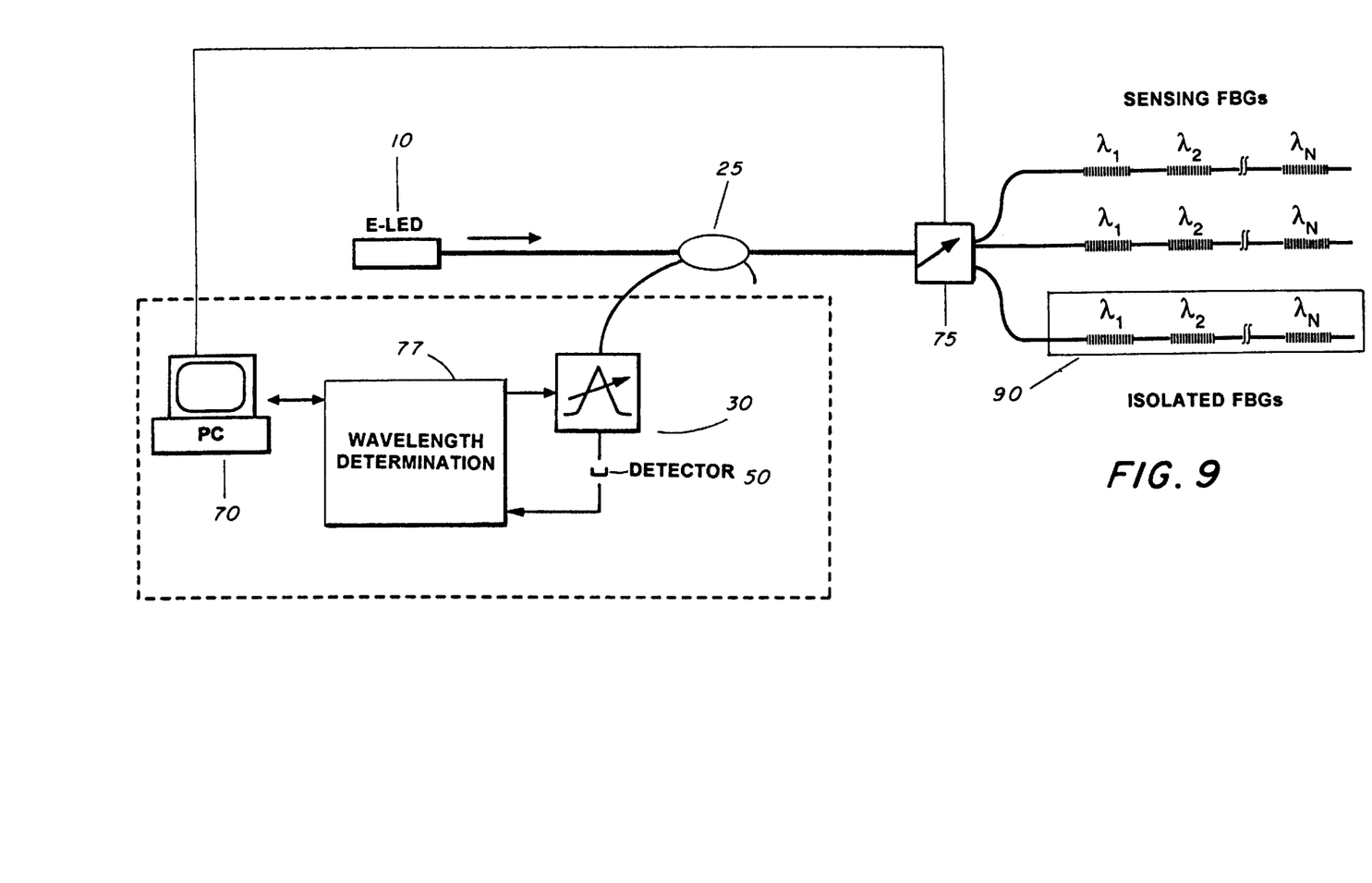
FIG. 9 shows a reference array of gratings addressed using an optical switch.
Figure 10:
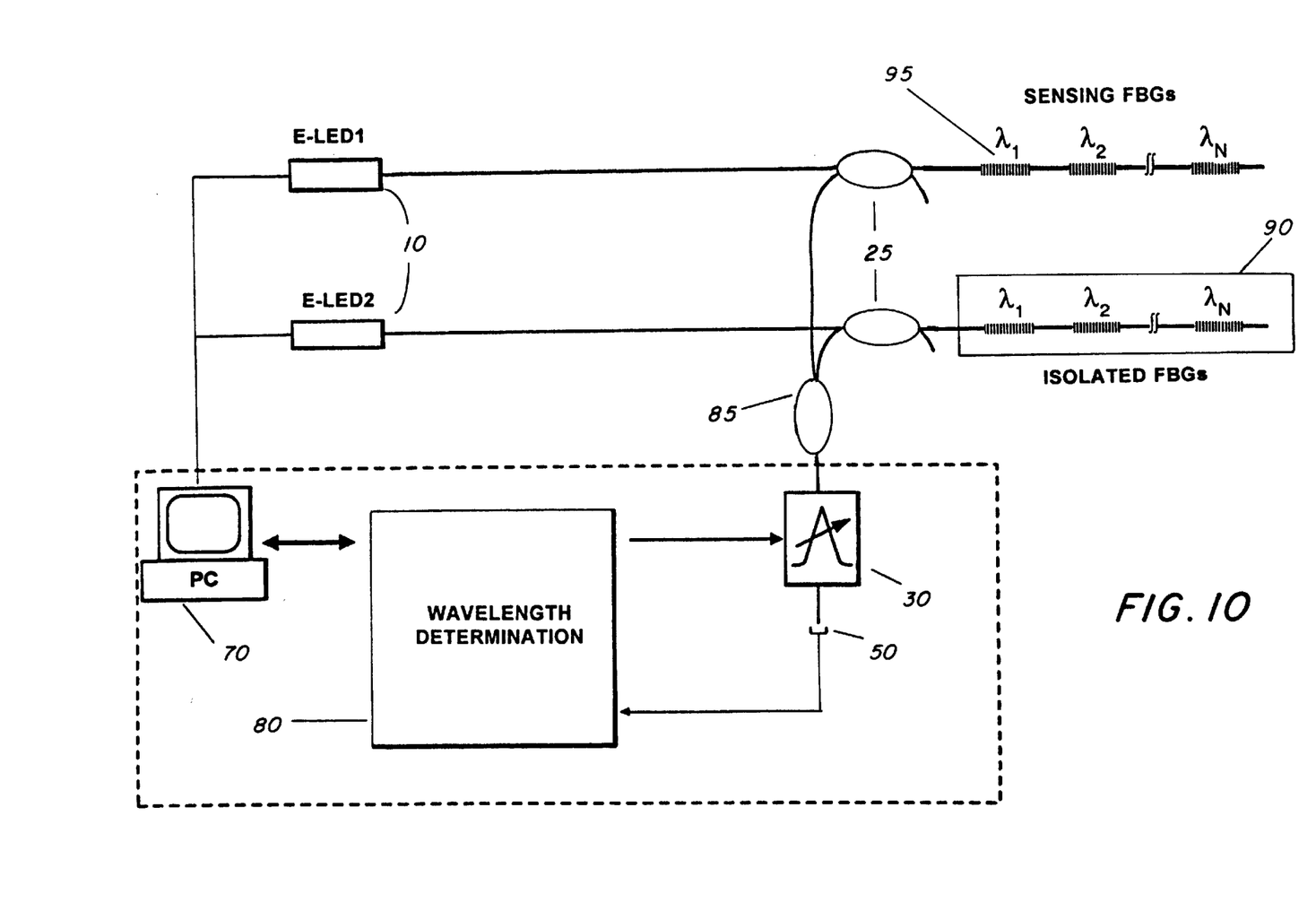
FIG. 10 shows a reference array of gratings addressed using synchronously driven sources.
Figure 11:
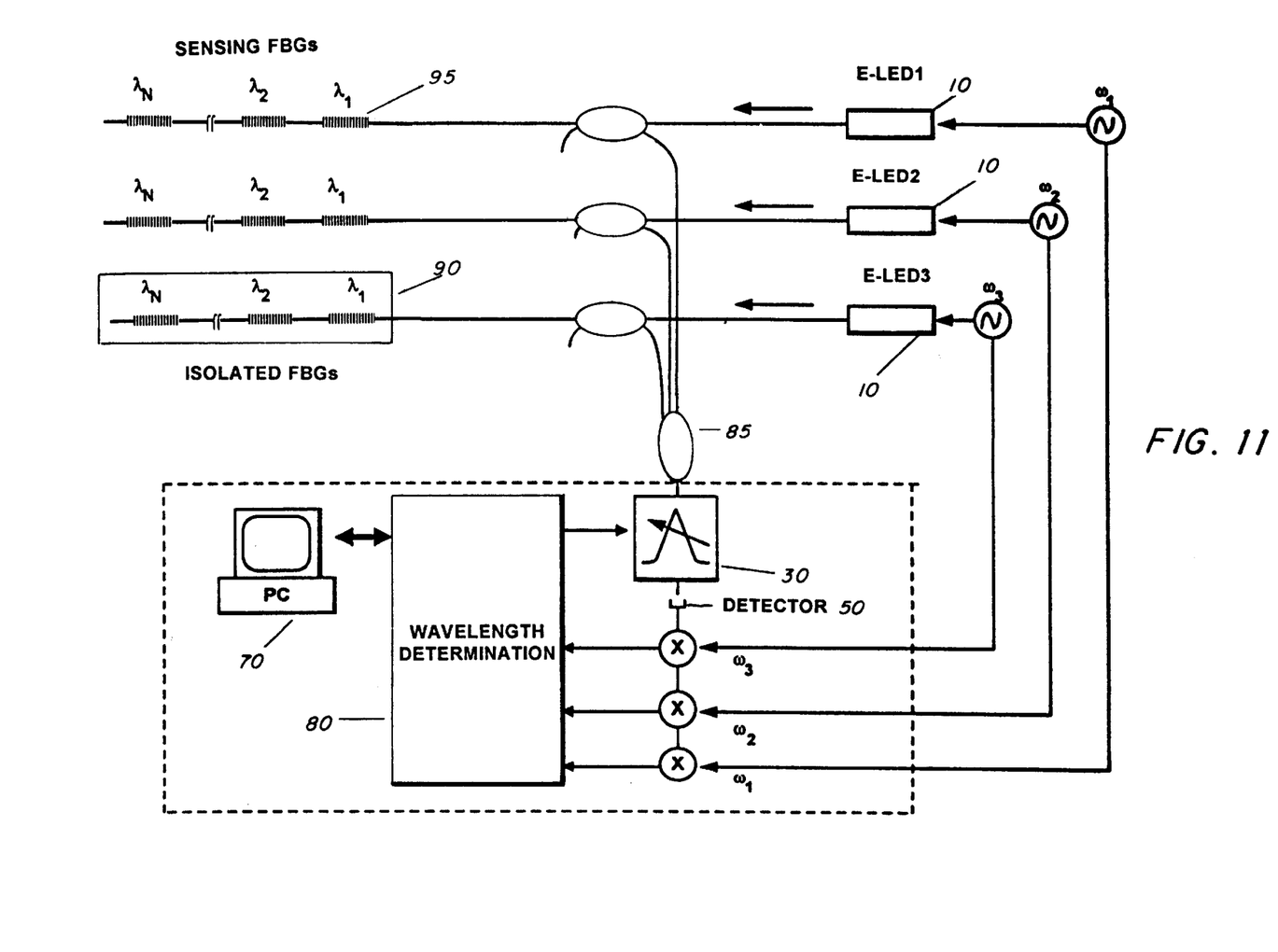
FIG. 11 shows a reference array of gratings addressed using frequency intensity modulation.
Figure 12:
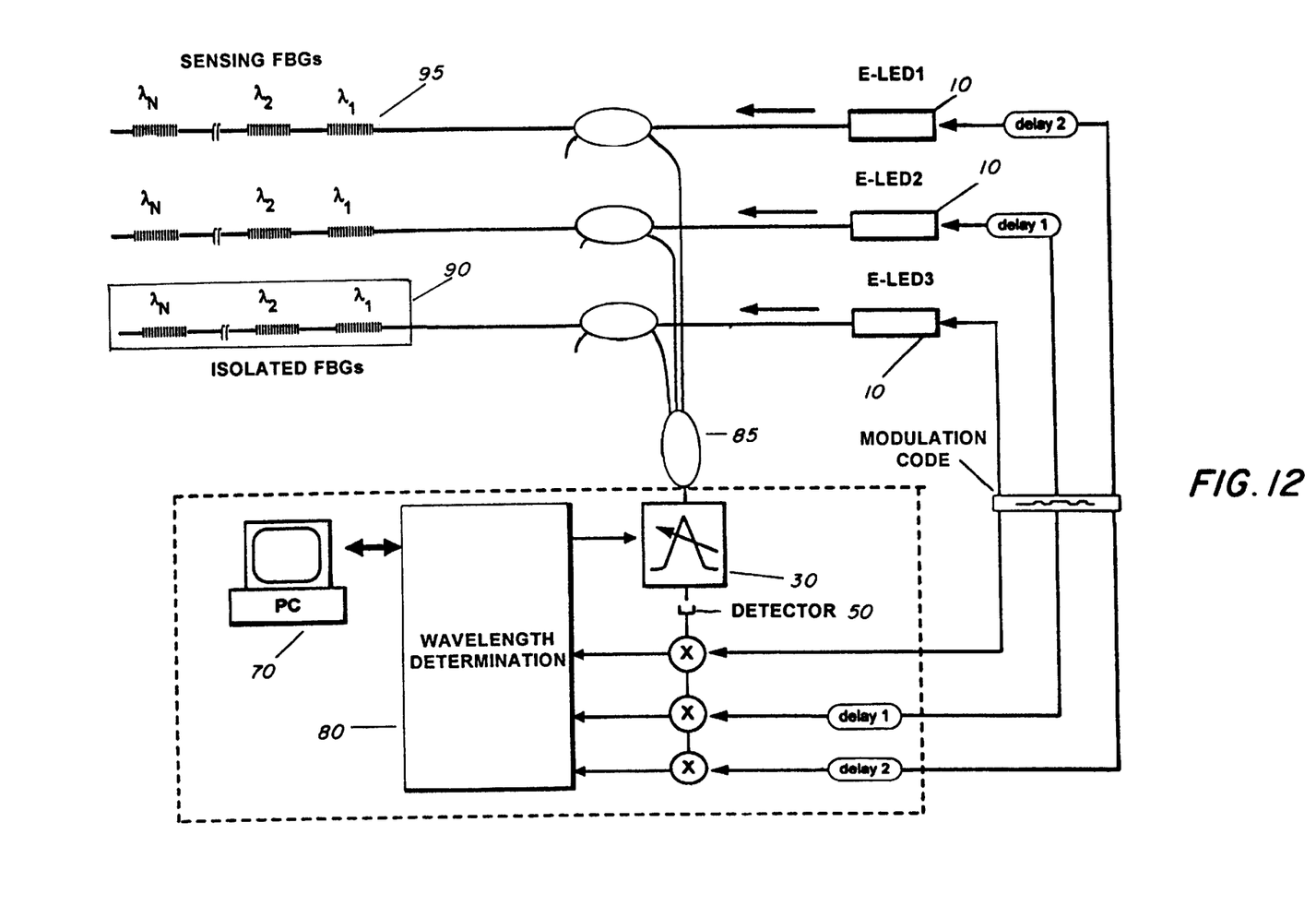
FIG. 12 shows a reference array of gratings addressed using code intensity modulation.

FIG. 9 shows one embodiment of a wavelength determination system employing such an isolated and stabilized reference array 90 of gratings. The computer 70 has previously stored the precise wavelength returns of the reference array. Thus, when the reference array is subsequently interrogated with optical switch 75, the computer 70 can compare the returns with the previously stored returns. With this comparison, the computer 70, using an adaptive least-squares algorithm, for example, can then fit a curve to correctly scale the data obtained from the sensing arrays 95. As discussed above, this scaling has the effect of compensating for any drift in the spectral response of the optical filter 30. The computer 70 can process the data from the reference array 90 as frequently as the sensing arrays 95, or at some other time interval. The result is a real-time adaptive calibration curve that compensates for any variations in the nonlinear response of the optical filter. FIGS. 10, 11, and 12 show other embodiments of the present invention where the reference string of gratings is incorporated into a wavelength determination system with synchronously driven sources, frequency intensity modulation, and code intensity modulation.

It will be apparent to those skilled in the art that various modifications and variations can be made in the present invention without departing from the spirit or scope of the invention. For example, a variety of narrowband filters can be used, including fiber coupled Fabry-Perot interferometers, cascaded Mach Zehnders, acousto-optically tuned filters, polarization based filters and in-fiber grating based filters. Also, the reference wavelength signals used in the calibration of the FP filter can be derived using a variety of methods including an isolated FBG array, a spectral comb or another Fabry-Perot filter having a spectrum range equal to the signal spacing.

It is intended that the present invention cover the modifications and variations of this invention provided they come within the scope of the appended claims and their equivalents.

We claim:

1. A method for calibrating an optical filter comprising the steps of:

obtaining reference wavelength signals;

comparing the reference wavelength signals to previously stored wavelength signals;

receiving through an optical filter spectral returns from at least one sensor optical fiber having at least one grating; and processing the spectral returns to determine their wavelengths wherein said processing step includes the step of compensating for filter characteristics based on the comparison of the reference wavelength signals to previously stored wavelength signals.

2. The method of claim 1 wherein said obtaining step includes the steps of:

illuminating an isolated optical fiber having a plurality of gratings; and receiving spectral returns from the isolated optical fiber through the optical filter.

3. The method of claim 2 wherein said obtaining step further includes:

the step of multiplexing the spectral returns from the isolated optical fiber and the at least one sensor optical fiber.

4. The method of claim 3 wherein said multiplexing step includes:

the step of optically switching among the isolated optical fiber and the at least one sensor optical fiber.

5. The method of claim 3 wherein said multiplexing step includes:

the step of intensity modulating the isolated optical fiber and the at least one sensor optical fiber.

6. The method of claim 2 wherein the optical filter is a tunable optical filter.

7. A system for calibrating an optical filter comprising:

a source of reference wavelength signals;

a comparator, coupled to said source, for comparing the reference wavelength signals to previously stored wavelength signals;

an optical filter;

at least one sensor optical fiber having at least one grating;

a receiver for receiving through said optical filter spectral returns from said at least one sensor optical fiber having at least one grating; and a processor for processing the spectral returns to determine their wavelengths wherein said processor includes a compensator for compensating for filter characteristics based on the comparison of the reference wavelength signals and the previously stored wavelength signals.

8. The system of claim 7 wherein said source includes:

means for illuminating an isolated optical fiber having a plurality of gratings; and a coupler to direct spectral returns from said isolated optical fiber through said optical filter.

9. The system of claim 8 wherein said source further includes:

a multiplexor for multiplexing the spectral returns from said isolated optical fiber and said at least one sensor optical fiber.

10. The system of claim 9 wherein:

said multiplexor comprises an optical switch.

11. The system of claim 9 wherein:

said multiplexor comprises an intensity modulator for intensity modulating said isolated optical fiber and said at least one sensor optical fiber.

12. The system of claim 7 wherein:

said optical filter is a tunable optical filter.

* * * * *